United States Patent
Hansson et al.

(10) Patent No.: US 10,224,704 B2
(45) Date of Patent: Mar. 5, 2019

(54) WELDING SLEEVE FOR ARMOURED CABLES

(71) Applicant: NKT HV Cables GmbH, Baden (CH)

(72) Inventors: Anders Hansson, Lyckeby (SE); Andreas Tyrberg, Lyckeby (SE); Johan Hedlund, Karlskrona (SE)

(73) Assignee: NKT HV Cables GmbH, Baden (CH)

( * ) Notice: Subject to any disclaimer, the term of this patent is extended or adjusted under 35 U.S.C. 154(b) by 0 days.

(21) Appl. No.: 15/552,461

(22) PCT Filed: Feb. 19, 2016

(86) PCT No.: PCT/EP2016/053567
§ 371 (c)(1),
(2) Date: Aug. 21, 2017

(87) PCT Pub. No.: WO2016/131965
PCT Pub. Date: Aug. 25, 2016

(65) Prior Publication Data
US 2018/0034255 A1    Feb. 1, 2018

(30) Foreign Application Priority Data
Feb. 19, 2015    (WO) ................. PCT/EP2015/053530

(51) Int. Cl.
*H01R 4/02* (2006.01)
*H02G 15/007* (2006.01)
(Continued)

(52) U.S. Cl.
CPC ........... *H02G 15/007* (2013.01); *H01R 4/021* (2013.01); *H02G 1/16* (2013.01); *H02G 15/085* (2013.01); *H02G 15/18* (2013.01); *H02G 15/14* (2013.01)

(58) Field of Classification Search
CPC .......... H01R 4/02; H01R 4/021; H01R 43/00; H02G 1/14; H02G 1/16; H02G 15/007;
(Continued)

(56) References Cited

U.S. PATENT DOCUMENTS

| 4,416,061 A * | 11/1983 | Aanerud | ................ H01R 43/00 |
| | | | 174/84 C |
| 2014/0044489 A1* | 2/2014 | Critsinelis | ................. F16L 3/02 |
| | | | 405/184.4 |

FOREIGN PATENT DOCUMENTS

| CL | 9606319.3 | 3/1996 |
| DE | 598148 C | 6/1934 |

(Continued)

OTHER PUBLICATIONS

International Preliminary Report on Patentability Application No. PCT/EP2016/053567 dated Mar. 23, 2017 10 Pages.

(Continued)

*Primary Examiner* — Timothy Thompson
*Assistant Examiner* — Guillermo Egoavil
(74) *Attorney, Agent, or Firm* — Whitmyer IP Group LLC

(57) ABSTRACT

A welding sleeve for armored cables including a first sleeve part arranged to receive an armored cable, wherein the first sleeve part has a perimeter surface for welding armoring wires of an armored cable thereto, a second sleeve part arranged to receive an armored cable, wherein the second sleeve part has a perimeter surface for welding armoring wires of an armored cable thereto, wherein the first sleeve part is arranged to receive the second sleeve part, the second sleeve part being axially displaceable relative to the first sleeve part, along a common central axis, between an extended position and a retracted position, in which retracted position the first sleeve part receives a greater portion of the second sleeve part than in the extended position, and a rotation preventing arrangement arranged to (Continued)

prevent rotational motion of the first sleeve part relative to the second sleeve part.

18 Claims, 4 Drawing Sheets

(51) Int. Cl.
    *H02G 15/08*      (2006.01)
    *H02G 1/14*      (2006.01)
    *H02G 1/16*      (2006.01)
    *H02G 15/18*      (2006.01)
    *H02G 15/14*      (2006.01)

(58) Field of Classification Search
    CPC ...... H02G 15/08; H02G 15/085; H02G 15/14; H02G 15/18; Y10T 29/49123
    USPC ................... 174/75 R, 84 C; 29/828
    See application file for complete search history.

(56) References Cited

FOREIGN PATENT DOCUMENTS

| | | |
|---|---|---|
| DE | 19921311 A1 | 11/2000 |
| DE | 20211333 U1 | 9/2002 |
| EP | 1898506 A2 | 3/2008 |
| EP | 2214279 A2 | 8/2010 |
| GB | 2106336 A | 4/1983 |
| GB | 2183402 A | 6/1987 |
| JP | S519293 U | 1/1976 |
| JP | S519293 U * | 1/1976 ............... H02G 1/14 |
| JP | H06225437 A | 8/1994 |
| JP | 2013150370 A * | 8/2013 ............. H02G 15/08 |
| JP | 2013162634 A | 8/2013 |
| JP | 2014087201 A | 5/2014 |
| WO | 2011000881 A2 | 1/2011 |

OTHER PUBLICATIONS

International Search Report Application No. PCT/EP2016/053567 Completed: Apr. 26, 2016; dated May 4, 2016 3 Pages.
Written Opinion of the International Preliminary Examining Authority Application No. PCT/EP2016/053567 dated Jan. 31, 2017 5 Pages.
International Search Report and Written Opinion of the International Searching Authority Application No. PCT/EP2016/053567 Completed Date: Apr. 26, 2016; dated May 4, 2016 15 Pages.
Chilean Office Action & Written Opinion & Translation Application No. 201702125 dated Oct. 12, 2018.

* cited by examiner

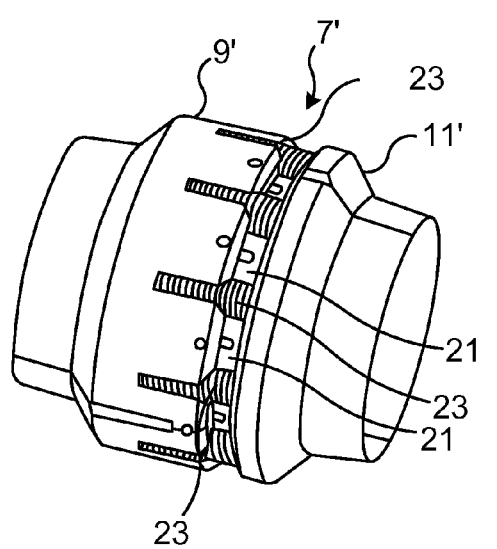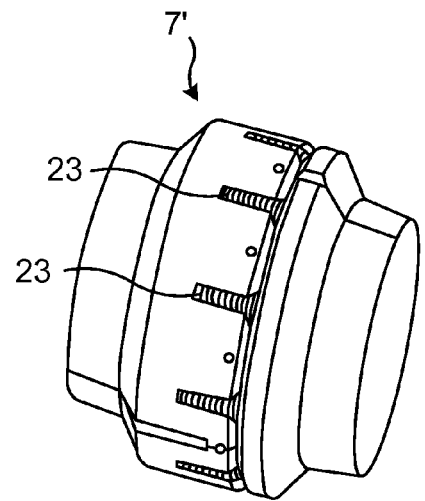
Fig. 3a    Fig. 3b
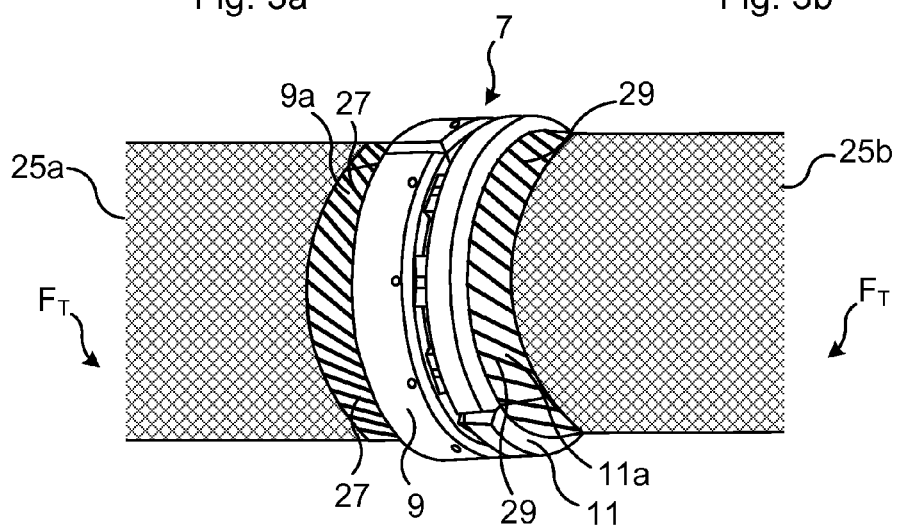
Fig. 4a
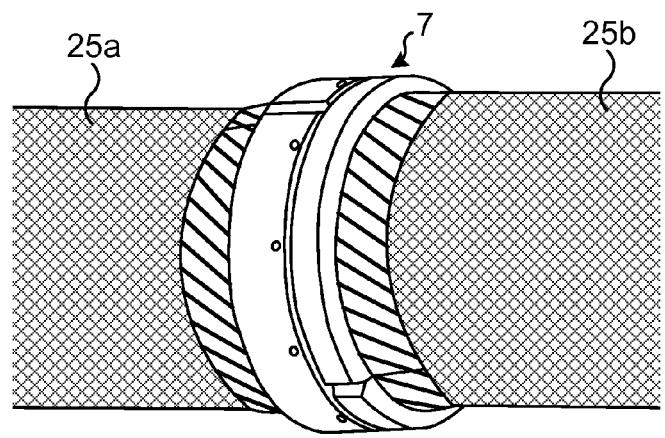
Fig. 4b

WELDING SLEEVE FOR ARMOURED CABLES

TECHNICAL FIELD

The present disclosure generally relates to armoured cables. In particular it relates to a welding sleeve for such cables.

BACKGROUND

The coiling of armoured cables refers to a storage method where the cable is laid down on a fixed coil pad or in a fixed coil tank, i.e. no rotating turntable is used. The coil pad can for example be a circular or oblong area on the ground. The cable is lowered from above and forms turns around the fixed coil pad or fixed coil tank.

While the cable is laid around the fixed coil pad/tank it is subjected to torsion around its longitudinal axis. For each complete turn around the fixed coil pad/tank the internal twist amounts to 360°. If the cable is unable to accept a 360° twist along each turn around the coil pad it will inevitably form screws, loops or kinks. The twisting hence causes deformations in the cable which can be temporary or permanent. The amplitude and character of the deformations are decisive for the ability of the cable to be coiled. The coiling parameters should be such that all deformations disappear during final installation. The critical issue is the behaviour of the armouring wires under coiling.

FIG. 1 shows the longitudinal cable axis and two cross section planes 3 and 5 of an armoured cable. One armouring wire 1 is visible with an armour angle $\alpha$ measured against the cross sectional plane 3. The armouring wire layer has the diameter $D_A$. During coiling, the two cross sectional planes 3, 5 are rotated by a small angle $\beta$ with respect to each other. The armouring wire 1 changes its lay angle from $\alpha$ to $\alpha'$ with $\alpha' > \alpha$. The armouring wire 1 aligns itself closer to the longitudinal axis A. As a result, the armouring wire 1 occupies a longer length l' of the cable and the cable therefore has to absorb an additional length $\Delta l = l' - l$. The magnitude of $\Delta l$ depends, among other things, on the induced twist in the cable, the armouring pitch length and the diameter $D_A$ of the armouring layer.

The generated additional length of the armouring wire can result in one or a combination of the following: 1) the armouring wires expand from a helix with a first diameter to a larger helix with a second diameter, outwards against the retaining force of the polypropylene yarn of the cable. If the diameter grows too much the yarn can break. 2) If there is little friction between the wires and other cable components the wires can start to migrate longitudinally in the cable. Compression forces in the wires are accumulated until there is an inhomogeneity in the force balance between wires and polypropylene yarn. The yarn can break which results in the formation of a radial protrusion of the armour wires creating a so-called bird cage. Alternatively, if the yarn is intact and the compressive stress in the armour wires becomes too large it can result in Euler buckling and the wires form Z-kinks. 3) The cable experiences a de facto elongation against the retaining force of the conductor.

In the best case the twisting obtained from coiling is equally distributed along the cable. However, if the mechanical properties of the cable are not uniform weak points such as those containing a discontinuity in the armour wires, such as a weld or repair, are more sensitive and may therefore become mechanically overstressed. A welding sleeve is used to repair the amour wire or for jointing the armour layers when jointing two cable lengths. The sleeve is a rigid steel ring onto which the armour wires from each length are welded. The ring prevents the wires from moving radially thereby increasing the stress in the area around the weld when the cable undergoes twisting.

To reduce the risk of deformation, the diameter of the coiled cable has to be increased along a section containing a welding sleeve, e.g. for repairing armouring wire of a cable or for jointing two cables. This complicates the coiling operation, increasing the time, and also the risk of damage. The situation becomes even more complex if coiling or semi-coiling is performed onto a vessel with a limited amount of available space.

SUMMARY

An object of the present disclosure is to solve, or at least mitigate, the problems of the prior art.

There is hence according to a first aspect of the present disclosure provided a welding sleeve for armoured cables, wherein the welding sleeve comprises a first sleeve part arranged to receive an armoured cable, wherein the first sleeve part has a perimeter surface for welding armouring wires of an armoured cable thereto, a second sleeve part arranged to receive an armoured cable, wherein the second sleeve part has a perimeter surface for welding armouring wires of an armoured cable thereto, wherein the first sleeve part and the second sleeve part are mechanically connected and coaxially arranged, wherein the second sleeve part has a first radial surface and a second radial surface, wherein the first radial surface is oppositely arranged, and axially displaced from the second radial surface, whereby the first radial surface and the second radial surface delimit an axial section of the second sleeve part therebetween, wherein the first sleeve part has a radially extending blocking portion immovably fixed to the first sleeve part, which blocking portion is arranged to interact with the first radial surface and the second radial surface, the blocking portion being arranged in the axial section of the second sleeve part, wherein the first sleeve part is axially displaceable relative to the second sleeve part, between a first position in which the blocking portion only bears against the first radial surface of the first radial surface and the second radial surface and a second position in which the blocking portion bears only against the second radial surface of the first radial surface and the second radial surface.

An effect which may be obtainable thereby is that when compressive stress is generated in the armouring wires welded to the welding sleeve, for example during a coiling operation, the first sleeve part and the second sleeve part are pushed towards each other thus reducing the compressive stress, thereby reducing the risk for buckling.

One embodiment comprises a rotation preventing arrangement arranged to prevent rotational motion of the first sleeve part relative to the second sleeve part when the first sleeve part and the second sleeve part are in tension. The rotation preventing arrangement restricts twisting of the welding sleeve and therefore provides better control of the compressional stress reduction obtained by the axial displacement of the second sleeve part. As a result, the cable may be coiled with a smaller diameter along the section comprising the welding sleeve.

According to one embodiment one of the first sleeve part and the second sleeve part is received by the other one of the first sleeve part and the second sleeve part.

According to one embodiment the first sleeve part is only displaceable axially relative to the second sleeve part.

According to one embodiment one of the first sleeve part and the second sleeve part has an outer perimeter having a first non-circular cross-sectional shape, and wherein the other one of the first sleeve part and the second sleeve part has an inner perimeter having said first non-circular cross-sectional shape to allow that of the first sleeve part and the second sleeve part which has the inner perimeter having the first cross-sectional shape to slidably receive the other one of the first sleeve part and the second sleeve part, thereby forming the rotation preventing arrangement.

According to one embodiment the second sleeve part comprises a plurality of first radial surfaces each forming a first end wall of a respective axial slot, a plurality of second radial surfaces, each forming a second end wall of a respective axial slot, the plurality of axial slots being distributed along the perimeter of the second sleeve part, and wherein the first sleeve part comprises a plurality of taps distributed along its perimeter, each tap defining one of said radially extending blocking portion, wherein each tap is received by a respective axial slot.

According to one embodiment all of the taps are arranged in a first cross-sectional plane of the first sleeve part and all of the axial slots are arranged in a second cross-sectional plane of the second sleeve part.

According to one embodiment each axial slot has the same axial length.

According to one embodiment the first sleeve part comprises the taps and the second sleeve part comprises the axial slots.

According to one embodiment the first sleeve part has a first sleeve part end portion having a plurality of recesses distributed along the perimeter, and the second sleeve part has a second sleeve part end portion having a plurality of teeth distributed along the perimeter, wherein each tooth of the second sleeve part is arranged in a respective recess.

According to one embodiment each tooth of the second sleeve part is provided with a respective axial slot of the axial slots, and each recess of the first sleeve part is provided with a respective tap of the taps.

According to one embodiment the axial slots and the taps form part of the rotation preventing arrangement.

According to one embodiment the recesses of the first sleeve part and the teeth of the second sleeve part form part of the rotation preventing arrangement.

One embodiment comprises a plurality of energy accumulating members arranged to bias the second sleeve part towards the second position in which the first sleeve part and the second sleeve part are biased away from each other. The first sleeve part and the second sleeve part can thereby be stabilised. The energy accumulating members also facilitate to push the armouring wires to their original position when a cable attached to the welding sleeve is uncoiled.

According to one embodiment each energy accumulating member is a spring.

According to one embodiment each spring is one of a die spring, a disc spring or a wave spring.

According to one embodiment the first sleeve part and the second sleeve part are made of metal.

According to a second aspect of the present disclosure there is provided a welding sleeve for armoured cables, wherein the welding sleeve comprises a first sleeve part having a plurality of openings, and arranged to receive an armoured cable, wherein the first sleeve part has a perimeter surface for welding armouring wires of an armoured cable thereto, a second sleeve part having a plurality of openings, and arranged to receive an armoured cable, wherein the second sleeve part has a perimeter surface for welding armouring wires of an armoured cable thereto, a plurality of longitudinal members, and a plurality of first stoppers and second stoppers, wherein each longitudinal member extends axially from a respective opening of the first sleeve part to a respective opening of the second sleeve part, whereby the first sleeve part and the second sleeve part are coaxially mounted to each other, wherein each longitudinal member is provided with a first stopper at one end thereof for delimiting axial displacement of the first sleeve part, wherein the opposite end of each longitudinal member forms a second stopper for delimiting axial displacement of the second sleeve part, wherein the longitudinal members have a longitudinal extension which allows the first sleeve part and the second sleeve part to slide along the longitudinal members between the first stoppers and second stoppers, enabling axial displacement of the first sleeve part relative to the second sleeve part.

This welding sleeve provides a somewhat different solution to the same problem solved by the first aspect.

One embodiment comprises a plurality of energy accumulation members arranged to bias the first sleeve part axially away from the second sleeve part.

According to one embodiment each energy accumulation member is provided around a respective longitudinal member.

According to a third aspect of the present disclosure there is provided a welding sleeve for armoured cables, wherein the welding sleeve comprises: a first sleeve part arranged to receive an armoured cable, wherein the first sleeve part has a perimeter surface for welding armouring wires of an armoured cable thereto, a second sleeve part arranged to receive an armoured, wherein the second sleeve part has a perimeter surface for welding armouring wires of an armoured cable thereto, wherein the first sleeve part is arranged to receive the second sleeve part, the second sleeve part being axially displaceable relative to the first sleeve part, along a common central axis, between an extended position and a retracted position, in which retracted position the first sleeve part receives a greater portion of the second sleeve part than in the extended position, and a rotation preventing arrangement arranged to prevent rotational motion of the first sleeve part relative to the second sleeve part.

According to one embodiment one of the first sleeve part and the second sleeve part comprises a plurality of axial slots distributed along its perimeter, and wherein the other one of the first sleeve part and the second sleeve part comprises a plurality of taps distributed along its perimeter, wherein each tap is received by a respective axial slot.

According to one embodiment each axial slot has a first end wall and a second end wall opposite the first end wall, wherein each tap is axially displaceable in its respective axial slot, between the first end wall and the second end wall, corresponding to the retracted position and the extended position of the second sleeve part, respectively.

According to one embodiment all of the taps are arranged in a first cross-sectional plane of the first sleeve part and all of the axial slots are arranged in a second cross-sectional plane of the second sleeve part.

According to one embodiment each axial slot has the same axial length.

According to one embodiment the first sleeve part comprises the taps and the second sleeve part comprises the axial slots.

According to one embodiment the first sleeve part has a first sleeve part end portion having a plurality of recesses distributed along the perimeter, and the second sleeve part has a second sleeve part end portion having a plurality of teeth distributed along the perimeter, wherein each tooth of the second sleeve part is arranged in a respective recess.

According to one embodiment each tooth of the second sleeve part is provided with a respective axial slot of the axial slots, and each recess of the first sleeve part is provided with a respective tap of the taps.

According to one embodiment the axial slots and the taps form part of the rotation preventing arrangement.

According to one embodiment the recesses of the first sleeve part and the teeth of the second sleeve part form part of the rotation preventing arrangement.

One embodiment comprises a plurality of energy accumulating members arranged to bias the second sleeve part towards the extended position. The first sleeve part and the second sleeve part can thereby be stabilised. The energy accumulating members also facilitate to push the armouring wires to their original position when a cable attached to the welding sleeve is uncoiled.

According to one embodiment each energy accumulating member is a spring.

According to one embodiment each spring is one of a die spring, a disc spring or a wave spring.

According to one embodiment the first sleeve part and the second sleeve part are made of metal.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIGS. 3a and 3b show a second example of a welding sleeve;

FIGS. 4a and 4b shows the welding sleeve in FIGS. 2a and 2b in operation;

FIG. 7b is a front view of the welding sleeve in FIG. 7a.

DETAILED DESCRIPTION

Figure 1:
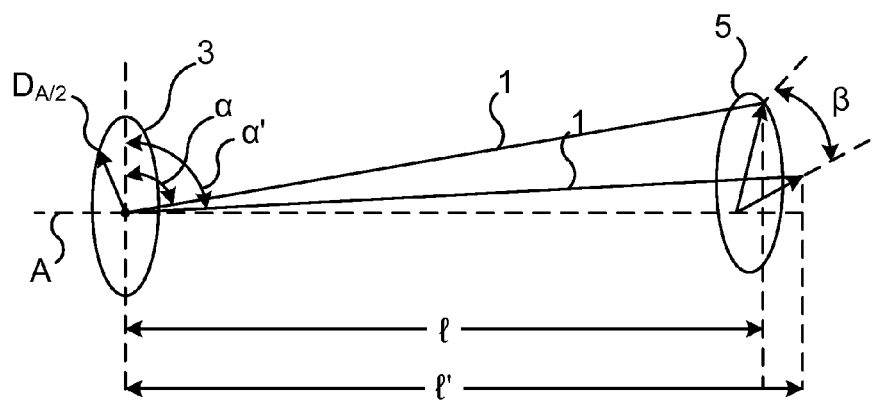
FIG. 1 schematically illustrates the arising of twisting of a cable during coiling.

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The welding sleeves presented herein may be utilised for repairing the armour layer of an armoured cable or for jointing two armoured cables thereby forming a single armoured cable. In the latter case, the welding sleeve is hence a welding sleeve joint. Armoured cables which may beneficially be utilised with the welding sleeve may for example be medium voltage armoured cables or high voltage armoured cables for AC or DC applications. One particular example of an armoured cable that may be utilised with the welding sleeve is a marine cable, e.g. a power cable for subsea applications.

In general, the welding sleeve comprises a first sleeve part and a second sleeve part. The first sleeve part is arranged to receive an armoured cable. In particular, the first sleeve part is arranged to receive the conductive core, i.e. the conductor (s) and conductor insulation. The second sleeve part is arranged to receive an armoured cable. In particular, the second sleeve part is arranged to receive the conductive core, i.e. the conductor(s) and conductor insulation. To this end, both the first sleeve part and the second sleeve part are annular with a suitable diameter to receive an armoured cable.

The first sleeve part has a perimeter surface for welding armouring wires of an armoured cable thereto. The perimeter surface of the first sleeve part is hence arranged to enable welding of armour wires to the perimeter surface.

The second sleeve part has a perimeter surface for welding armouring wires of an armoured cable thereto. The perimeter surface of the second sleeve part is hence arranged to enable welding of armour wires to the perimeter surface.

The first sleeve part and the second sleeve part are mechanically connected and coaxially arranged. The second sleeve part is axially displaceable relative to the first sleeve part, along a common central axis. The second sleeve part is axially displaceable between a first position relative to the first sleeve part and a second position relative to the first sleeve part. In the first position the welding sleeve is in an open or extended state, while in the second position, the welding sleeve is in a compressed state.

The welding sleeve further comprises a rotation preventing arrangement arranged to prevent rotational motion of the first sleeve part relative to the second sleeve part, at least when the first sleeve part and the second sleeve part are subjected to tension. The first sleeve part and the second sleeve part are hence axially displaceable relative to each other, between two end positions, while relative rotation between the first sleeve part and the second sleeve part is restricted.

During installation the second sleeve part is set in the first position, thus preventing the second sleeve part from being displaced further from the first sleeve part. The welding sleeve is hence set in its open or extended state. Thus, when armouring wires are welded to the first sleeve part and to the second sleeve part, the welding sleeve is set in tension. The welding sleeve is preferably made of metal such as steel.

A first example of a welding sleeve will now be described with reference to FIGS. 2a and 2b. Welding sleeve 7 comprises a first sleeve part 9 and a second sleeve part 11. The first sleeve part 9 receives the second sleeve part 11. The first sleeve part 9 and the second sleeve part 11 are arranged to be axially displaceable relative to each other. The second sleeve part 11 may be seen to be axially displaceable relative to the first sleeve part 9, between an extended position and a retracted position. The second sleeve part 11 is hence movable along the common central axis C of the first sleeve part 9 and the second sleeve part 11 between two end positions, namely the extended, or first position, and the compressed, retracted or second, position. In the retracted position, the first sleeve portion 9 receives a greater portion of the second sleeve part 11 than it does compared to when the second sleeve part 11 is in the extended position.

Figures 2A, 2B:
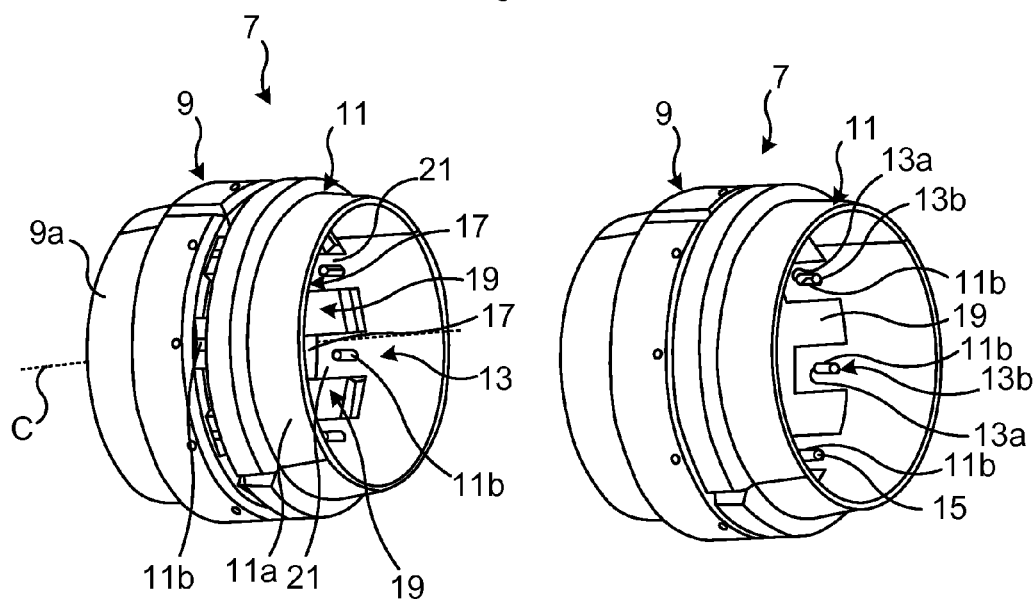
FIGS. 2a and 2b show a first example of a welding sleeve.

In FIG. 2a the welding sleeve 7 is shown in its open state in which the second sleeve portion 11 is in the extended position relative to the first sleeve part 9. In FIG. 2b the welding sleeve 7 is shown in its compressed state in which the second sleeve portion 11 is in the retracted position relative to the second sleeve part 11.

The first sleeve part 9 has a perimeter surface 9a against which armouring wires of an armoured cable may be welded. The perimeter surface 9a may define the outer perimeter, as shown in FIG. 2a, or the inner perimeter. The second sleeve part 11 has a perimeter surface 11a against which armouring wires of an armoured cable may be welded. The perimeter surface 11a may define the outer perimeter, as shown in FIG. 2a, or the inner perimeter. To this end, both perimeter surfaces 9a and 11a are arranged to enable welding of armouring wires thereto. According to the example in FIGS. 2a and 2b, the first sleeve part 9 has its perimeter surface 9a at its distal end portion relative to the second sleeve part 11, and the second sleeve part has its perimeter surface 11a at its distal end portion relative to the first sleeve part 9. The perimeter surfaces 9a, 11a may for example be smooth or essentially smooth, or comprise a plurality of grooves for receiving a respective armouring wire.

The welding sleeve 7 further comprises a rotation preventing arrangement 13 which prevents rotational motion of the first sleeve part 9 relative to the second sleeve part 11. The welding sleeve 7 hence enables axial displacement of the second sleeve part 11 relative to the first sleeve part 9, and prevents rotational motion of the second sleeve part 11 relative to the first sleeve part 9. In this manner, compressive stress in armouring wires welded to the perimeter surfaces 9a, 11a may be reduced, thereby reducing the risk of buckling of the armouring wires.

The second sleeve part 11 has a plurality of first radial surfaces and second radial surfaces, which pairwise are oppositely arranged and axially displaced. According to the present example pairs of first radial surfaces and second radial surfaces form part of axial slots. Hence according to the present example, the second sleeve part 11 has a plurality of axial slots 11b distributed around its circumference or perimeter. The first sleeve part 9 has a plurality of immovably fixed and radially extending blocking portions, each being associated with a respective slot. Each radially extending blocking portion is according to the present example a fixedly arranged tap. Hence the exemplified first sleeve part 9 has a plurality of fixedly arranged taps, i.e. protruding members, 15 distributed around its circumference or perimeter. Each tap 15 is provided on the inner surface of the first sleeve part 9. Each tap 15 is received by a respective axial slot 11b. The number of axial slots 11b is hence the same as the number of taps 15. Each axial slot 11b may have the same axial length. The taps 15 are slidably arranged in their axial slots 11b and are thus axially displaceable in their respective axial slots 11b. To this end, each axial slot 11b has a respective first end wall 13a, i.e. a first radial surface, and second end wall 13b, i.e. a second radial surface, defining the axial direction end walls of the axial slot 11b in question. Each tap 15 is axially displaceable between the first end wall 13a, corresponding to the first or extended position of the second sleeve part 11, and the second end wall 13b, corresponding to the second or retracted position of the second sleeve part 11. The cooperation between the axial slots 11b and the taps 15 hence define the maximal axial displacement of the second sleeve part 11 relative to the first sleeve part 9. The first radial surface and the second radial surface hence delimit an axial section therebetween, defining the distance of relative axial displacement between the first sleeve part 9 and the second sleeve part 11.

According to one variation, all of the taps 15 are arranged in a first cross-sectional plane of the first sleeve part 9. The first cross-sectional plane is orthogonal to the common central axis C. The taps 15 may for example be evenly distributed around the perimeter of the first sleeve part 9.

According to one variation, all of the axial slots 11b are arranged in a second cross-sectional plane of the second sleeve part 11. The second cross-sectional plane is orthogonal to the common central axis C and parallel with the first cross-sectional plane. The axial slots 11b may preferably be evenly distributed around the perimeter of the second sleeve part 11.

It should be noted that alternatively it would also be possible to design the first sleeve part with the axial slots and the second sleeve part with taps.

The first sleeve part 9 has a first sleeve end portion provided with a plurality of recesses 17 distributed along its inner perimeter in the tangential direction. The first sleeve end portion is a proximal end portion of the first sleeve part 9. The recesses form a pattern that defines a plurality of teeth 19 distributed along the inner perimeter of the first sleeve part 9, each tooth 19 being defined between two adjacent recesses 17.

The second sleeve part 11 has a second sleeve end portion which runs into the first sleeve end portion. The second sleeve end portion is a proximal end portion of the second sleeve part 11. The second sleeve end portion comprises a plurality of teeth 21 distributed along the perimeter of the second sleeve part 11. Each tooth 21 of the second sleeve part 11 is arranged in a respective recess 17 between to adjacent teeth 19 of the first sleeve part 9. Moreover each tooth 19 of the first sleeve part 9 is arranged between adjacent teeth 21 of the second sleeve part 11. Each tooth 21 of the second sleeve part 11 is arranged to slide in a respective recesses 17.

According to one variation, each recess is provided with a respective tap 15 of the taps 15 and each tooth 21 of the second sleeve part 11 is provided with a respective axial slot 11b of the axial slots 11b. The teeth 21 of the second sleeve part 11 hence run in the recesses 17 of the first sleeve part 9, with their axial movement being delimited by the interaction between the axial slots 11b and the taps 15.

Each tap 15 may have a dimension corresponding essentially to the width dimension of the axial slots 11b, defined along the tangential direction. Rotational motion of the first sleeve part 9 relative to the second sleeve part 11 may thereby be restricted. To this end, the taps 15 and the axial slots 11b may form part of, or even define, the rotation preventing arrangement 13.

The recesses 17 of the first sleeve part 9 and the teeth 21 of the second sleeve part 11 are preferably designed with small tolerances in the sense that relative movement in the tangential direction is restricted to be minimal. To this end, the recesses 17 of the first sleeve part 9 and the teeth 21 of the second sleeve part 11 form part of, or even define, the rotation preventing arrangement 13.

The taps 15 and axial slots 11b alone hence form a rotation preventing arrangement, while the recesses 17 and teeth 21 of the second sleeve part 11 alone also form a rotation preventing arrangement. Together these two separate rotation preventing arrangements form a reinforced rotation preventing arrangement.

FIG. 3a shows a second example of a welding sleeve 7'. Welding sleeve 7' is similar to the welding sleeve 7 of the first example, however welding sleeve 7' also comprises a plurality of energy accumulating members 23. The welding sleeve 7' hence comprises a first sleeve part 9' and a second sleeve part 11 which is received by the first sleeve part 9'. In FIG. 3a the welding sleeve 7' is shown in its open state, i.e. the second sleeve part 11' being in the extended position relative to the first sleeve part 9', and FIG. 3b shows the welding sleeve 7' in the compressed state, i.e. the second sleeve part 11' being in the retracted position relative to the first sleeve part 9'.

The energy accumulating members 23 are arranged to bias the second sleeve part 11' towards the extended position. To this end, each energy accumulating member 23 is arranged with a first end towards the first sleeve part 9' and a second end, opposite to the first end, towards the second sleeve part if, the first end and the second end defining end portions of an energy accumulating member 23 along an axis along which the energy accumulating member is compressible.

According to the example in FIGS. 3a and 3b, the energy accumulating members 23 are distributed in the tangential direction along the periphery of the welding sleeve 7'. In particular, each energy accumulating member 23 is arranged between two adjacent teeth 21 of the second sleeve part 11', extending into a corresponding cut-out in the first sleeve part 9'. These cut-outs are formed in the first sleeve end portion between adjacent recesses corresponding to recesses 17 of the example illustrated in FIGS. 2a and 2b.

The energy accumulating members 23 may be springs, for example die springs, disc springs or wave springs. According to one embodiment the energy accumulating members can be defined by an inlay made of rubber or a polymeric material such as polyurethane.

FIGS. 4a and 4b shows the welding sleeve 7 in use. The welding sleeve 7' functions in the same manner, except that the energy accumulating members 23 strive to push the first sleeve part 9' and the second sleeve part 11' away from each other.

According to the example in FIG. 4a, a first armoured cable 25a and a second armoured cable 25b are attached to the welding sleeve 7. For this purpose, the armouring wires 27 and 29 have been exposed beneath the external sheath, cut and bent radially outwards. The first armoured cable 25 is attached to the welding sleeve 7 by means of welding the armouring wires 27 to the perimeter surface 9a of the first sleeve part 9 and the second armoured cable 25 is attached to the welding sleeve 7 by means of welding the armouring wires 29 to the perimeter surface 11a of the second sleeve part 11. The welding sleeve 7 hence forms a welding sleeve joint via which the first high armoured voltage cable 25a and the second armoured cable 25b are connected. In this manner, the first armoured cable 25a and the second armoured cable 25b form a single armoured cable.

According to the example, the single armoured cable has been coiled, wherein torsional forces $F_T$ act on the single cable, resulting in compressional stress in the armouring wires 27, 29. Therefore, the first sleeve part 9 and the second sleeve part 11 are pushed towards each other along their common central axis, wherein the second sleeve part 11 obtains its retracted position and the welding sleeve obtains its compressed state, as shown in FIG. 4b. Thereby, the compressive stress in the armouring wires 27, 29 may be reduced thus reducing the risk of buckling of the armouring wires 27, 29.

Figure 5:
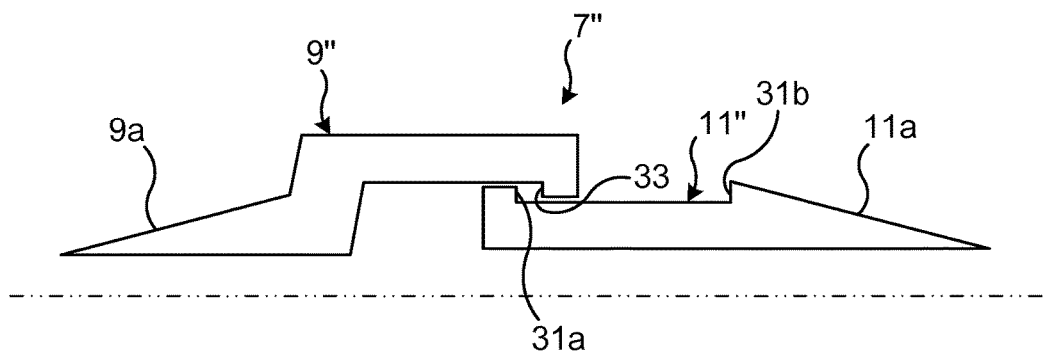
FIG. 5 shows a longitudinal section of a third example of a welding sleeve.

FIG. 5 shows another example of a welding sleeve. Welding sleeve 7" is similar to the previously described examples in that it has a first sleeve part 9" and a second sleeve part 11". The first sleeve part 9" and the second sleeve part 11" are coaxially arranged, and configured to receive an armoured cable. Both sleeves 9" and 11" have respective perimeter surfaces 9a, 11a for welding armour wires of an armoured cable thereto. The first sleeve part 9" and the second sleeve part 11" are axially displaceable relative to each other. According to the example, the first sleeve part 9" is arranged to receive the second sleeve part 11", i.e. in an assembled state of the welding sleeve 7" the first sleeve part 9" receives the second sleeve part 11".

More generally, one of the first sleeve part and the second sleeve part is arranged to receive the other one of the first sleeve part and the second sleeve part coaxially.

The second sleeve part 11" has first and second radial surfaces 31a and 31b that are axially displaced and oppositely arranged, i.e. facing each other. The first sleeve part 9" has a radially extending blocking portion 33 which is fixedly arranged to the first sleeve part 9" and arranged between the first radial surface 31a and the second radial surface 31b. The first sleeve part 9" and the second sleeve part 11" are arranged to slide axially between a first position in which the radially extending blocking portion 33 bears against only the first radial surface 31a of the two oppositely arrange radially surfaces 31a, 31b, and a second position in which the radially extending blocking portion 33 bears against only the second radial surface 31b of the two oppositely arranged surfaces 31a, 31b. The first radial surface 31a and the second radial surface 31b act to delimit relative axial movement of the first sleeve part 9" and the second sleeve part 11".

It should here be noted that the radially extending blocking portion could as an alternative be provided on the second sleeve part instead of on the first sleeve part, in which case the first radial surface and the second radial surface would be provided on the first sleeve part.

The welding sleeve 7" also has a rotation preventing arrangement to prevent rotational motion of the first sleeve part 9" relative to the second sleeve part 11". The rotation preventing arrangement may for example be arranged to prevent relative rotation when the first sleeve part and the second sleeve part are in tension or when the welding sleeve is fully compressed and subjected to compression. To this end, the rotation preventing arrangement may be arranged to prevent relative rotation when the first sleeve part is in the first position and the two sleeve parts are in tension or in the second position and the two sleeve parts are in compression. Thus, according to one variation, rotation may be allowed during axial displacement but not while the first sleeve part and the second sleeve part are axially fixed relative to each other due to tensional or compressional forces.

As an example there may be a plurality of pairs of first radial surfaces and second radial surfaces forming the first end wall and second end wall of respective slots, and these slots can be slightly angled relative to the axial direction, for example with the same angle as the helical configuration of the armour wires. In this case, rotation is prevented while the corresponding tabs are arranged in a fixed location in the slots due to the tensional forces from the armoured cables welded to the welding sleeve. However, when the first sleeve part slides relative to the second sleeve part, there will be rotation between the two sleeve parts, as the tabs run in the angled slots.

Figures 6A, 6B:
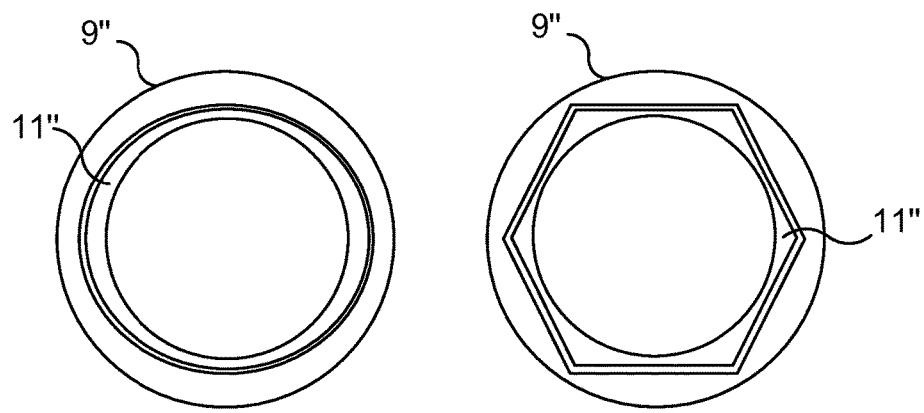
FIGS. 6a and 6b show examples of cross-sections of welding sleeve in FIG. 5.

According to the examples shown in FIGS. 6a and 6b, the rotation preventing arrangement is formed by the cross-sectional shapes of the first sleeve part 9" and the second sleeve part 11". The outer surface, or outer perimeter, of the second sleeve part 11" has a first non-circular cross-sectional shape, and the inner surface, or inner perimeter, of the first sleeve part 9" also has the same first non-circular cross-sectional shape. This allows relative axial displacement of the first sleeve part 9" and the second sleeve part 11" but prevents rotation between these to components.

The first non-circular cross-sectional shape may for example be polygonal or elliptical. FIGS. 6a and 6b show examples of first non-circular cross-sectional shapes. In FIG. 6a, the first cross-sectional shape is elliptical and in FIG. 6b the first cross-sectional shape is polygonal, in particular hexagonal.

The cross-sectional shape of the inner perimeter of the received sleeve part and the cross-sectional shape of the outer perimeter of the receiving sleeve part is preferably circular.

As an example, in order to enable relative rotation between the first sleeve part and the second sleeve part only during axial displacement, according to one variation, one of the two first non-circular cross-sectional shapes may be twisted in the axial direction.

Figure 7A:
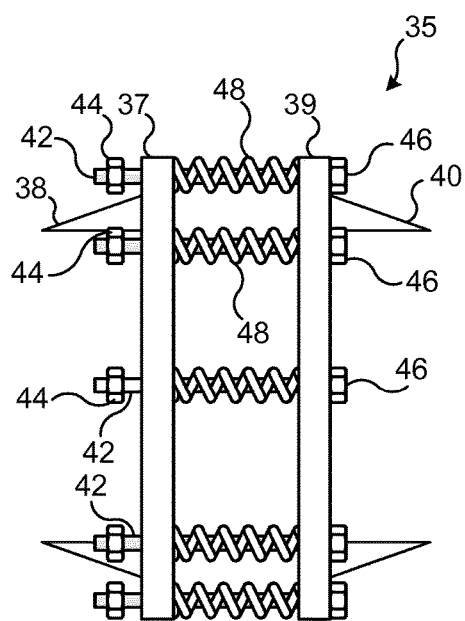
FIG. 7a is a longitudinal section of a fourth example of a welding sleeve.
Figure 7B:
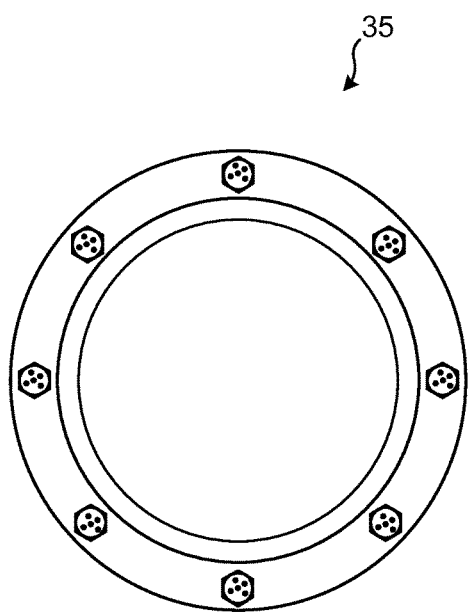

FIG. 7a shows another example of a welding sleeve. Welding sleeve 35 has a first sleeve part 37 arranged to receive an armoured cable, and has a perimeter surface 38 for welding armouring wires of an armoured cable thereto. The welding sleeve 35 also has a second sleeve part 39 arranged to receive an armoured cable, and has a perimeter surface 40 for welding armouring wires of an armoured cable thereto.

The first sleeve part 37 has a plurality of axial openings distributed along its periphery and the second sleeve part 39 has corresponding axial openings distributed along its periphery. The welding sleeve 35 furthermore includes a plurality of longitudinal members 41 received in the axial openings and extending between the first sleeve part 37 and the second sleeve part 39 to thereby provide a mechanical connection of the first sleeve part 37 to the second sleeve part 39 in a coaxial manner.

The welding sleeve 35 furthermore includes first stoppers 44 and second stoppers 46. The first stoppers 44 are mounted to one end of the longitudinal members 42 and the second stoppers 46 are either defined by the heads of the longitudinal members 42 or mounted to the other end of the longitudinal members 42. The longitudinal members 42 have an axial extension or length which allows the first sleeve part 37 and the second sleeve part 39 to slide axially relative to each other in a mounted state of the welding sleeve 35.

The first stoppers 44 and the second stoppers 46 delimit the axial distance which the first sleeve part 37 and the second sleeve part 39 are allowed to move relative to each other. The first stoppers 42 may for example be nuts and the second stoppers may for example be the heads of the longitudinal members 42. The longitudinal members 42 may for example be bolts.

The welding sleeve 35 may furthermore include energy accumulation members 48 arranged to bias the first sleeve part 37 axially away from the second sleeve part 39. Each energy accumulation member 48 may for example be mounted around a respective longitudinal member 42. The energy accumulation members 48 may for example be compression springs.

According to any variation disclosed herein each of the first sleeve part and the second sleeve part may comprise several circular sectors or circle sectors for facilitating the mounting of the welding sleeve around a cable. The first sleeve part and the second sleeve part may thereby be placed around e.g. a cable that has damaged armouring wires, in order to repair the armouring wires of the cable by means of the welding sleeve. The circle sectors placed around a cable may be welded to each other to form the welding sleeve, wherein the armouring wires are welded to the welding sleeve. Alternatively, each of the first sleeve part and the second sleeve part may be made of a single circular part, in which case they may be slid onto a cable during the installation procedure.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A welding sleeve for armoured cables, wherein the welding sleeve comprises:
   a first sleeve part arranged to receive an armoured cable, wherein the first sleeve part has a perimeter surface for welding armouring wires of an armoured cable thereto,
   a second sleeve part arranged to receive an armoured cable, wherein the second sleeve part has a perimeter surface for welding armouring wires of an armoured cable thereto, wherein the first sleeve part and the second sleeve part are mechanically connected and coaxially arranged, and
   a rotation preventing arrangement arranged to prevent rotational motion of the first sleeve part relative to the second sleeve part when the first sleeve part and the second sleeve part are in compression,
   wherein the second sleeve part has a first radial surface and a second radial surface, wherein the first radial surface is oppositely arranged, and axially displaced from the second radial surface, whereby the first radial surface and the second radial surface delimit an axial section of the second sleeve part therebetween,
   wherein the first sleeve part has a radially extending blocking portion immovably fixed to the first sleeve part, which blocking portion is arranged to interact with the first radial surface and the second radial surface, the blocking portion being arranged in the axial section of the second sleeve part, wherein the first sleeve part is axially displaceable relative to the second sleeve part, between an extended position in which the blocking portion bears only against the first radial surface and a retracted position in which the blocking portion bears only against the second radial surface; and
   wherein in the retracted position, the welding sleeve is in a compressed state.

2. The welding sleeve as claimed in claim 1, wherein one of the first sleeve part and the second sleeve part is received by the other one of the first sleeve part and the second sleeve part.

3. The welding sleeve as claimed in claim 2, wherein the first sleeve part is only displaceable axially relative to the second sleeve part.

4. The welding sleeve as claimed in claim 1, wherein one of the first sleeve part and the second sleeve part has an outer perimeter having a first non-circular cross-sectional shape, and wherein the other one of the first sleeve part and the second sleeve part has an inner perimeter having said first non-circular cross-sectional shape to allow that of the first sleeve part and the second sleeve part which has the inner perimeter having the first cross-sectional shape to slidably receive the other one of the first sleeve part and the second sleeve part, thereby forming the rotation preventing arrangement.

5. The welding sleeve as claimed in claim 1, wherein the second sleeve part comprises a plurality of first radial surfaces each forming a first end wall of a respective axial slot, a plurality of second radial surfaces, each forming a second end wall of a respective axial slot, the plurality of axial slots being distributed along the perimeter of the second sleeve part, and wherein the first sleeve part comprises a plurality of taps distributed along its perimeter, each tap defining one of said radially extending blocking portion, wherein each tap is received by a respective axial slot.

6. The welding sleeve as claimed in claim 5, wherein all of the taps are arranged in a first cross-sectional plane of the first sleeve part and all of the axial slots are arranged in a second cross-sectional plane of the second sleeve part.

7. The welding sleeve as claimed in claim 5, wherein each axial slot has the same axial length.

8. The welding sleeve as claimed in claim 5, wherein the first sleeve part has a first sleeve part end portion having a plurality of recesses distributed along the perimeter, and the second sleeve part has a second sleeve part end portion having a plurality of teeth distributed along the perimeter, wherein each tooth of the second sleeve part is arranged in a respective recess.

9. The welding sleeve as claimed in claim 8, wherein each tooth of the second sleeve part is provided with a respective axial slot of the axial slots, and each recess of the first sleeve part is provided with a respective tap of the taps.

10. The welding sleeve as claimed in claim 5, wherein the axial slots and the taps form part of the rotation preventing arrangement.

11. The welding sleeve as claimed in claim 8, wherein the recesses of the first sleeve part and the teeth of the second sleeve part form part of the rotation preventing arrangement.

12. The welding sleeve as claimed in claim 1, comprising a plurality of energy accumulating members arranged to bias the second sleeve part towards the second position in which the first sleeve part and the second sleeve part are biased away from each other.

13. The welding sleeve as claimed in claim 12, wherein each energy accumulating member is a spring.

14. The welding sleeve as claimed in claim 13, wherein each spring is one of a die spring, a disc spring or a wave spring.

15. The welding sleeve as claimed in claim 1, wherein the first sleeve part and the second sleeve part are made of metal.

16. A welding sleeve for armoured cables, wherein the welding sleeve comprises:
   a first sleeve part having a plurality of axial openings, and arranged to receive an armoured cable, wherein the first sleeve part has a perimeter surface for welding armouring wires of an armoured cable thereto,
   a second sleeve part, having a plurality of axial openings, and arranged to receive an armoured cable, wherein the second sleeve part has a perimeter surface for welding armouring wires of an armoured cable thereto,
   a plurality of longitudinal members,
   a plurality of first stoppers and second stoppers, and
   a plurality of energy accumulation members arranged to bias the first sleeve part axially away from the second sleeve part,
   wherein each longitudinal member extends axially from a respective axial opening of the first sleeve part to a respective axial opening of the second sleeve part, whereby the first sleeve part and the second sleeve part are coaxially mounted to each other,
   wherein each longitudinal member is provided with a first stopper at one end thereof for delimiting axial displacement of the first sleeve part, wherein the opposite end of each longitudinal member forms a second stopper for delimiting axial displacement of the second sleeve part,
   wherein the longitudinal members have a longitudinal extension which allows the first sleeve part and the second sleeve part to slide along the longitudinal members between the first stoppers and second stoppers, enabling axial displacement of the first sleeve part relative to the second sleeve part.

17. The welding sleeve as claimed in claim 16, wherein each energy accumulation member is provided around a respective longitudinal member.

18. The welding sleeve as claimed in claim 16, wherein the first stoppers are nuts, the longitudinal members are bolts and the second stoppers are the heads of the bolts.

* * * * *